United States Patent
Chen et al.

(10) Patent No.: US 9,657,972 B2
(45) Date of Patent: May 23, 2017

(54) SOLAR-BIOMASS COMPLEMENTARY THERMAL ENERGY SUPPLY SYSTEM

(71) Applicant: Zhongying Changjiang International New Energy Investment Co., Ltd., Wuhan (CN)

(72) Inventors: Yilong Chen, Wuhan (CN); Qingping Yang, Wuhan (CN); Yanfeng Zhang, Wuhan (CN); Wenyan Liu, Wuhan (CN)

(73) Assignee: ZHONGYING CHANGJIANG INTERNATIONAL NEW ENERGY INVESTMENT CO., LTD., Wuhan (CN)

( * ) Notice: Subject to any disclaimer, the term of this patent is extended or adjusted under 35 U.S.C. 154(b) by 166 days.

(21) Appl. No.: 14/732,771

(22) Filed: Jun. 7, 2015

(65) Prior Publication Data
US 2015/0267945 A1 Sep. 24, 2015

Related U.S. Application Data

(63) Continuation-in-part of application No. PCT/CN2013/088570, filed on Dec. 5, 2013.

(30) Foreign Application Priority Data

Dec. 6, 2012 (CN) .......................... 2012 1 0520274

(51) Int. Cl.
*F25B 27/00* (2006.01)
*F24D 11/00* (2006.01)
(Continued)

(52) U.S. Cl.
CPC .............. *F25B 27/002* (2013.01); *F03G 6/06* (2013.01); *F03G 6/067* (2013.01); *F24D 11/003* (2013.01);
(Continued)

(58) Field of Classification Search
CPC ...... F25B 27/002; F25B 15/06; F25B 27/007; F25C 1/00; F03G 6/06; F03G 6/067;
(Continued)

(56) References Cited

U.S. PATENT DOCUMENTS

2009/0199557 A1 * 8/2009 Bennett ................... F01K 3/008
60/641.15

FOREIGN PATENT DOCUMENTS

| CN | 101196305 A | * | 6/2008 | ............. Y02B 10/20 |
| CN | 201706579 U | * | 1/2011 | ............. Y02B 10/70 |

* cited by examiner

*Primary Examiner* — Emmanuel Duke
(74) *Attorney, Agent, or Firm* — Matthias Scholl P.C.; Matthias Scholl

(57) ABSTRACT

A thermal energy supply system, including: a solar concentrating device, a solar storage tank including a first heat exchanger and a second heat exchanger, a biomass power station including a biomass boiler, a central refrigeration and ice maker, and a central hot water supply tank. The solar concentrating device is connected to the solar storage tank. The inlet of the first heat exchanger of the solar storage tank is connected to the outlet of a feedwater pump of the biomass boiler. The outlet of the first heat exchanger is connected to the inlet of a water feeding system of the biomass boiler. The inlet pipe of the second heat exchanger of the solar storage tank is connected to the outlet pipe of a water purification plant. The outlet of the second heat exchanger is connected to a thermal energy input pipe of the central refrigeration and ice maker.

13 Claims, 2 Drawing Sheets

(51) Int. Cl.
*F03G 6/06* (2006.01)
*F25C 1/00* (2006.01)
*F28D 20/00* (2006.01)
*F25B 15/06* (2006.01)

(52) U.S. Cl.
CPC .............. *F24D 11/005* (2013.01); *F25C 1/00* (2013.01); *F24D 2200/28* (2013.01); *F25B 15/06* (2013.01); *F25B 27/007* (2013.01); *F28D 2020/0078* (2013.01); *Y02B 10/20* (2013.01); *Y02E 10/46* (2013.01); *Y02P 80/15* (2015.11)

(58) Field of Classification Search
CPC .. F24D 11/005; F24D 11/003; F24D 2200/28; Y02P 80/15; F28D 2020/0078; Y02B 10/20

See application file for complete search history.

SOLAR-BIOMASS COMPLEMENTARY THERMAL ENERGY SUPPLY SYSTEM

CROSS-REFERENCE TO RELATED APPLICATIONS

This application is a continuation-in-part of International Patent Application No. PCT/CN2013/088570 with an international filing date of Dec. 5, 2013, designating the United States, now pending, and further claims priority benefits to Chinese Patent Application No. 201210520274.4 filed Dec. 6, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND OF THE INVENTION

Field of the Invention

The invention relates to a solar-biomass complementary thermal energy supply system.

Description of the Related Art

Conventionally, energy supply systems have been independent from one another. For example, electric power plants supply electricity; air conditioners consume electricity; water heaters produce hot water; and electricity is consumed to make ice for food preservation. As a result, the energy utilization efficiency is rather low.

Biomass has wide distribution, large amount of reserves, clean combustion, and zero $CO_2$ emission. Likewise, solar energy has a wide distribution, limitless reserves, clean conversion, and zero $CO_2$ emission. However, large-scale application of solar power energy is largely restricted by weather. Thus, combining biomass energy and solar energy for power generation and for heat supply and removal is a new concept in comprehensive utilization of energy resources.

SUMMARY OF THE INVENTION

In view of the above-described problems, it is one objective of the invention to provide a solar-biomass complementary thermal energy supply system that can make full use of the complementarity of biomass energy and solar energy for central cool supply, ice supply and heat supply, so that the clean solar energy and biomass energy can be multi-recycled, thereby maximizing the utilization of energy. The solar-biomass complementary thermal energy supply system can be used in a low carbon industrial park for power generation, cooling and ice generation, and hot water generation.

To achieve the above objective, in accordance with one embodiment of the invention, there is provided a solar-biomass complementary thermal energy supply system, comprising: a solar concentrating device, a solar storage tank comprising a first heat exchanger and a second heat exchanger, a biomass power station comprising a biomass boiler, a central refrigeration and ice maker, and a central hot water supply tank, wherein the solar concentrating device is connected to the solar storage tank via pipes; an inlet of the first heat exchanger of the solar storage tank is connected to an outlet of a feedwater pump of the biomass boiler; an outlet of the first heat exchanger is connected to an inlet of a water feeding system of the biomass boiler; an inlet pipe of the second heat exchanger of the solar storage tank is connected to an outlet pipe of a water purification plant; an outlet of the second heat exchanger is connected to a thermal energy input pipe of the central refrigeration and ice maker; cooling water in the central refrigeration and ice maker absorbs released thermal energy produced by the central refrigeration and ice maker and converges with hot water from a waste heat collector disposed in a flue of the biomass boiler, and the confluent hot water is transported to the central hot water supply tank.

In a class of this embodiment, the solar storage tank comprises two media for heat exchange and two cycles; the two media are a heat storage medium and circulating water; the heat storage medium is heat conduction oil or molten salt and is disposed in the solar storage tank; the heat conduction oil or molten salt is driven by a high temperature pump to the solar concentrating device where the heat conduction oil or molten salt is heated by solar energy; the heated heat conduction oil or molten salt returns to the solar storage tank and releases heat energy; part of the heat energy heats the circulating water from the feedwater pump of the biomass boiler via the first heat exchanger, and the heated circulating water is introduced to the biomass boiler; another part of the heat energy heats the circulating water from the water purification plant via the second heat exchanger, and the heated circulating water is introduced to the central refrigeration and ice maker.

In a class of this embodiment, the solar storage tank comprises three media for heat exchange and two cycles; the three media are a heat storage medium, a heat transfer medium, and circulating water; the heat storage medium is molten salt disposed in the solar storage tank; the heat transfer medium is heat conduction oil disposed in a solar heat exchanger; the heat conduction oil is driven to the solar concentrating device where the heat conduction oil is heated by solar energy; the heated heat conduction oil returns to the solar storage tank and exchanges heat energy with the molten salt via the solar heat exchanger; part of the heated molten salt heats the circulating water from the feedwater pump of the biomass boiler via the first heat exchanger, and the heated circulating water is introduced to the biomass boiler; another part of the heated molten salt heats the circulating water from the water purification plant via the second heat exchanger, and the heated circulating water is introduced to the central refrigeration and ice maker.

In a class of this embodiment, the waste heat collector is disposed in the flue of the biomass boiler, and a hot water output pipe of the waste heat collector is connected to the central hot water supply tank.

In a class of this embodiment, the central hot water supply tank is connected to the solar storage tank via pipes, valves, and back water pumps.

In a class of this embodiment, the central refrigeration and ice maker is a lithium-bromide absorption-type refrigerator or an evaporation refrigerator.

In a class of this embodiment, the heat conduction medium in the solar concentrating device is heat conduction oil or molten salt.

In a class of this embodiment, the molten salt is a binary nitrate system comprising $NaNO_3$ and $KNO_3$, for example, between 40% and 90 wt. % of $NaNO_3$ and between 10% and 60 wt. % of $KNO_3$.

In a class of this embodiment, the molten salt is a ternary nitrate system comprising $NaNO_2$, $NaNO_3$, $KNO_3$, for example, between 5% and 10 wt. % of $NaNO_2$, between 30% and 70 wt. % of $NaNO_3$ and between 20% and 65 wt. % of $KNO_3$.

In a class of this embodiment, the binary nitrate system comprises between 40% and 60 wt. % of $NaNO_3$ and between 40% and 60 wt. % of $KNO_3$.

In a class of this embodiment, the ternary nitrate system comprises 7 wt. % of $NaNO_2$, 40 wt. % of $NaNO_3$ and 53 wt. % of $KNO_3$.

Advantages of the thermal energy supply system according to embodiments of the invention are summarized as follows. The thermal energy supply system makes full use of the complementarity of the biomass energy and solar energy for power generation, central cool supply (air conditioner), ice supply (fresh keeping) and heat supply, so that the clean solar energy and biomass energy can be recycled for three consecutive times. Compared with conventional energy utilization technology, the system of the invention is much more energy-efficient.

The heat storage medium in the solar storage tank is driven by the high temperature pump and flows through the solar concentrating device where the heat storage medium absorbs heat energy and raises the temperature and then returns to the heat insulation layer of the solar storage tank. The feedwater of the biomass boiler is driven by the feedwater pump and flows through the heat exchanger of the solar storage tank where the feedwater is heated and then introduced to the boiler for vapor generation. The produced vapor is transported to a turbine for power generation. The system of the invention employs practicable heat storage medium and heat energy collection equipment, solves the problem of unstable solar energy and saves the fuel consumption, and ensures the smooth operation of the turbine generator. In addition, the system employs the clean solar energy as a main power energy for cold and ice supply, and the produced waste heat from the power generation and cold and ice making can be used for hot water generation for bath or industrial applications such as food processing, textile, and printing and dyeing, thereby achieving the energy utilization recycling.

Compared with conventional energy utilization technology, the system of the invention is energy-saving, and produces only a small amount of dust, with $SO_2$ and $CO_2$ zero emission.

The solar storage tank of the system of the invention can be filled with multiple media, preferably, the heat storage medium is molten salt, which is much cheaper.

DETAILED DESCRIPTION OF THE EMBODIMENTS

For further illustrating the invention, experiments detailing a solar-biomass complementary thermal energy supply system are described below. It should be noted that the following examples are intended to describe and not to limit the invention.

Figure 1:
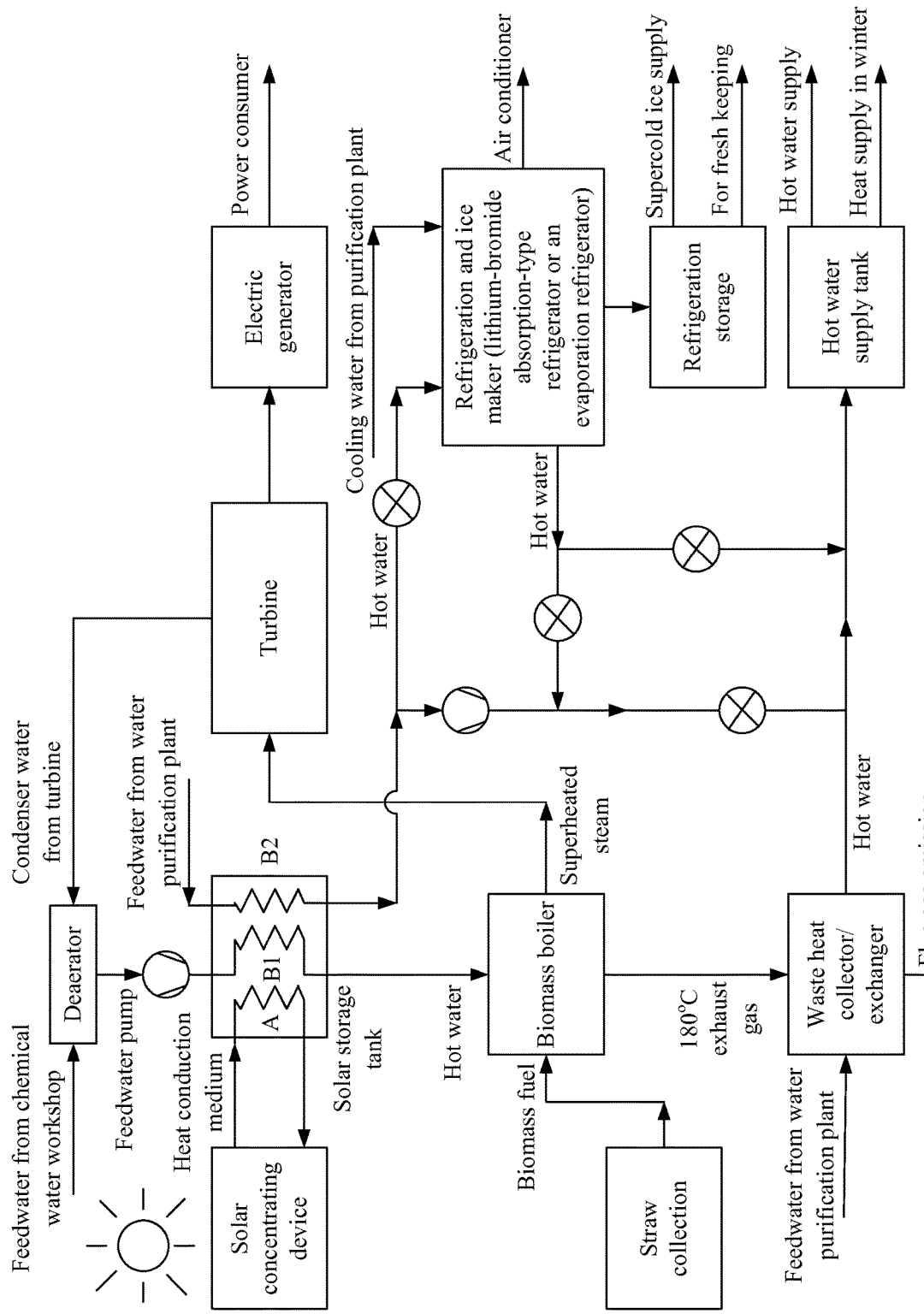
FIG. 1 is a schematic diagram of a solar-biomass complementary thermal energy supply system in accordance with one embodiment of the invention.

As shown in FIG. 1, the invention provides a solar-biomass complementary thermal energy supply system, comprising: a solar concentrating device, a solar storage tank comprising a first heat exchanger and a second heat exchanger, a biomass power station comprising a biomass boiler, a central refrigeration and ice maker, and a central hot water supply tank, wherein the solar concentrating device is connected to the solar storage tank via pipes; an inlet of the first heat exchanger B1 of the solar storage tank is connected to an outlet of a feedwater pump of the biomass boiler; an outlet of the first heat exchanger B1 is connected to an inlet of a water feeding system of the biomass boiler; an inlet pipe of the second heat exchanger B2 of the solar storage tank is connected to an outlet pipe of a water purification plant; an outlet of the second heat exchanger B2 is connected to a thermal energy input pipe of the central refrigeration and ice maker; cooling water in the central refrigeration and ice maker absorbs released thermal energy produced by the central refrigeration and ice maker and converges with hot water from a waste heat collector disposed in a flue of the biomass boiler, and the confluent hot water is transported to the central hot water supply tank.

Figure 2:
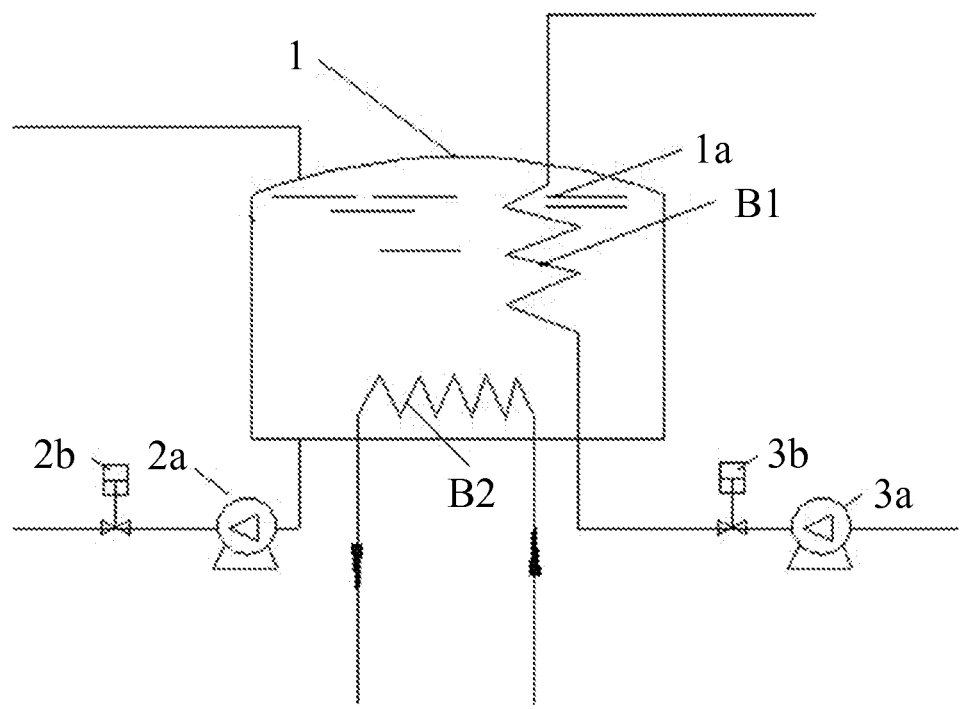
FIG. 2 is a schematic diagram of a solar storage tank comprising two media and two cycles.

FIG. 2 is a schematic diagram of a solar storage tank comprising two media and two cycles.

The heat storage medium 1a disposed in the solar storage tank heat 1 is conduction oil or molten salt. The heat conduction oil or molten salt is driven by a high temperature pump 2a through a high temperature valve 2b to the solar concentrating device where the heat conduction oil or molten salt is heated by solar energy. The heated heat conduction oil or molten salt returns to the solar storage tank and releases heat energy. Part of the heat energy heats the circulating water from the feedwater pump of the biomass boiler via the first heat exchanger B1, and the heated circulating water is introduced to the biomass boiler. 3a represents the feedwater pump of the biomass boiler, and 3b represents an outlet valve of the feedwater pump.

Another part of the heat energy heats the circulating water from the water purification plant via the second heat exchanger B2, and the heated circulating water is introduced to the central refrigeration and ice maker. The central refrigeration and ice maker is a lithium-bromide absorption-type refrigerator or an evaporation refrigerator. Preferably, the heat conduction oil is a mixture of 23.5 wt. % of biphenyl and 72.5 wt. % of diphenyl oxide. The molten salt is a mixture of $NaNO_3$ and $KNO_3$, or a mixture of $NaNO_2$, $NaNO_3$ and $KNO_3$.

Figure 3:
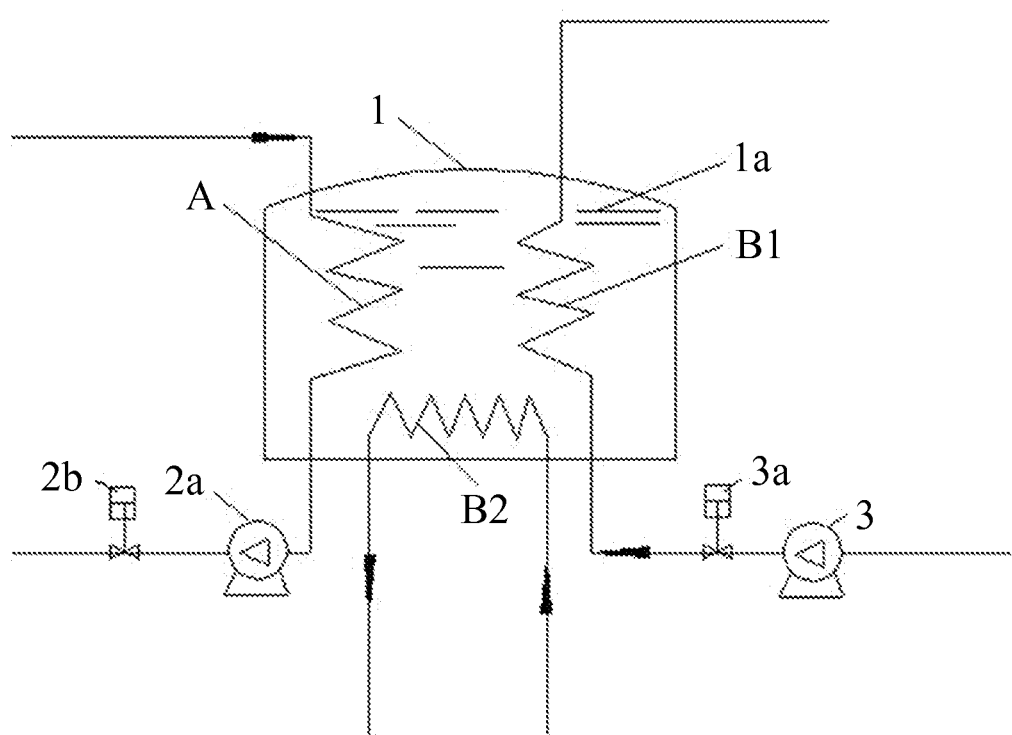
FIG. 3 is a schematic diagram of a solar storage tank comprising three media and two cycles.

FIG. 3 is a schematic diagram of a solar storage tank comprising three media and two cycles.

The three media are a heat storage medium, a heat transfer medium, and circulating water. The heat storage medium 1a is molten salt disposed in the solar storage tank 1. The heat transfer medium is heat conduction oil disposed in a solar heat exchanger A. The heat conduction oil is driven by a high temperature pump 2a through a high temperature valve 2b to the solar concentrating device where the heat conduction oil is heated by solar energy. The heated heat conduction oil returns to the solar storage tank and exchanges heat energy with the molten salt via the solar heat exchanger A. Part of the heated molten salt heats the circulating water from the feedwater pump of the biomass boiler via the first heat exchanger B1, and the heated circulating water is introduced to the biomass boiler. 3 represents the feedwater pump of the biomass boiler, and 3a represents an outlet valve of the feedwater pump.

When the solar-biomass complementary thermal energy supply system in FIG. 3 runs smoothly, part of the heated molten salt heats the circulating water from the water purification plant via the second heat exchanger B2, and the heated circulating water is introduced to the central refrigeration and ice maker. When the solar storage tank malfunctions for a long time, the molten salt tends to froze and block the pipes, and thus, superheated steam is introduced to the second heat exchanger B2 to solve the problem of freezing and blocking.

To maximize the complementarity of the biomass energy and solar thermal power generation and reduce the waste heat discharge of the system, a waste heat collector is disposed in the flue of the biomass boiler, and a hot water output pipe of the waste heat collector is connected to the central hot water supply tank. Cold water absorbs the waste heat of the exhaust gas of the biomass boiler and the discharged heat energy from the central refrigeration and ice maker and transforms into hot water, which is collected by the central hot water supply tank to supply hot water for a low carbon industrial park.

The solar concentrating device (employing parabolic trough type evacuated collector tubes, Fresnel type evacuated collector tubes, or tower type solar heat boiler) comprises a heat conduction medium, which absorbs the solar energy and then flows into the solar storage tank with high temperature. In the solar storage tank, the heat conduction medium undergoes the heat exchange and then has low temperature. The heat conduction medium is driven by a high temperature pump and functions as a circulating thermal medium between the solar concentrating device and the solar storage tank. The solar storage tank comprises another cycle, that is, water medium-vapor cycle. Specifically, condenser water from a turbine is confluent with softened water from a chemical water workshop in a deaerator for oxygen removal. The mixed water is driven by the feedwater pump and flows into the heat exchanger in the solar storage tank for heat exchange whereby absorbing heat energy and raising the temperature, and is then introduced to the steam drum of the biomass boiler for steam generation.

The heat conduction medium flowing through the solar concentrating device is heat conduction oil.

The heat conduction oil is a mixture of 23.5 wt. % of biphenyl and 72.5 wt. % of diphenyl oxide, which presents solid at the temperature of below 12° C., presents liquid but has high viscosity and poor fluidity at the temperature of between 12 and 50° C., and tends to thermally decompose at the temperature of exceeding 405° C. In general, the temperature of the mixture is controlled at between 50 and 395° C. for heat conduction.

Preferably, the molten salt is a binary nitrate system comprising $NaNO_3$ and $KNO_3$, for example, between 40% and 90 wt. % of $NaNO_3$ and between 10% and 60 wt. % of $KNO_3$.

The binary nitrate system presents solid at the temperature of below 295° C., presents liquid at the temperature of between 295 and 565° C., and tends to thermally decompose at the temperature of exceeding 565° C. In general, the temperature of the mixture is controlled at between 295 and 550° C. for heat conduction.

When the weight percentage of the components of the binary nitrate system varies, so do the temperature characteristics.

Preferably, the molten salt is a ternary nitrate system comprising $NaNO_2$, $NaNO_3$, $KNO_3$, for example, between 5% and 10 wt. % of $NaNO_2$, between 30% and 70 wt. % of $NaNO_3$ and between 20% and 65 wt. % of $KNO_3$.

The ternary nitrate system presents solid at the temperature of below 180° C., presents liquid at the temperature of between 180 and 500° C., and tends to thermally decompose at the temperature of exceeding 500° C., and decompose quickly at the temperature of exceeding 550° C. In general, the temperature of the mixture is controlled at between 180 and 500° C. for heat conduction.

When the weight percentage of the components of the ternary nitrate system varies, so do the temperature characteristics.

In summary, the thermal energy supply system of the invention makes full use of the complementarity of the biomass energy and solar energy for central cool supply, ice supply and heat supply, so that the clean solar energy and biomass energy can be recycled for three consecutive times, thereby maximizing the utilization of energy. The solar-biomass complementary thermal energy supply system can be used in a low carbon industrial park for power generation, cooling and ice generation, and hot water generation.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An energy supply system, comprising:
 a) a solar concentrating device;
 b) a solar storage tank, the solar storage tank comprising a first heat exchanger and a second heat exchanger;
 c) a biomass power station, the biomass power station comprising a biomass boiler;
 d) a central refrigeration and ice maker; and
 e) a central hot water supply tank;
 wherein
 the solar concentrating device is connected to the solar storage tank via pipes;
 an inlet of the first heat exchanger of the solar storage tank is connected to an outlet of a feedwater pump of the biomass boiler;
 an outlet of the first heat exchanger is connected to an inlet of a water feeding system of the biomass boiler;
 an inlet pipe of the second heat exchanger of the solar storage tank is connected to an outlet pipe of a water purification plant;
 an outlet of the second heat exchanger is connected to a thermal energy input pipe of the central refrigeration and ice maker; and
 cooling water in the central refrigeration and ice maker absorbs released thermal energy produced by the central refrigeration and ice maker and converges with hot water from a waste heat collector disposed in a flue of the biomass boiler, and confluent hot water is transported to the central hot water supply tank.

2. The system of claim 1, wherein
 the solar storage tank comprises two media for heat exchange and two cycles;
 the two media are a heat storage medium and circulating water; the heat storage medium is heat conduction oil or molten salt disposed in the solar storage tank; and
 in use, the heat conduction oil or molten salt is driven by a high temperature pump to the solar concentrating device where the heat conduction oil or molten salt is heated by solar energy; the heated heat conduction oil or molten salt returns to the solar storage tank and releases heat energy; part of the heat energy heats the circulating water from the feedwater pump of the biomass boiler via the first heat exchanger, and the heated circulating water is introduced to the biomass boiler; another part of the heat energy heats the circulating water from the water purification plant via the second heat exchanger, and the heated circulating water is introduced to the central refrigeration and ice maker.

3. The system of claim 2, wherein the central refrigeration and ice maker is a lithium-bromide absorption-type refrigerator or an evaporation refrigerator.

4. The system of claim 2, wherein the molten salt is a binary nitrate system.

5. The system of claim 4, wherein the binary nitrate system comprises between 40% and 90 wt. % of $NaNO_3$ and between 10% and 60 wt. % of $KNO_3$.

6. The system of claim 2, wherein the molten salt is a ternary nitrate system.

7. The system of claim 6, wherein the ternary nitrate system comprises between 5% and 10 wt. % of $NaNO_2$, between 30% and 70 wt. % of $NaNO_3$ and between 20% and 65 wt. % of $KNO_3$.

8. The system of claim 1, wherein
the solar storage tank comprises three media for heat exchange and two cycles;
the three media are a heat storage medium, a heat transfer medium, and circulating water; and
in use, the heat storage medium is molten salt disposed in the solar storage tank; the heat transfer medium is heat conduction oil disposed in a solar heat exchanger; the heat conduction oil is driven to the solar concentrating device where the heat conduction oil is heated by solar energy; the heated heat conduction oil returns to the solar storage tank and exchanges heat energy with the molten salt via the solar heat exchanger; part of the heated molten salt heats the circulating water from the feedwater pump of the biomass boiler via the first heat exchanger, and the heated circulating water is introduced to the biomass boiler; another part of the heated molten salt heats the circulating water from the water purification plant via the second heat exchanger, and the heated circulating water is introduced to the central refrigeration and ice maker.

9. The system of claim 8, wherein the central refrigeration and ice maker is a lithium-bromide absorption-type refrigerator or an evaporation refrigerator.

10. The system of claim 8, wherein the molten salt is a binary nitrate system.

11. The system of claim 10, wherein the binary nitrate system comprises between 40% and 90 wt. % of $NaNO_3$ and between 10% and 60 wt. % of $KNO_3$.

12. The system of claim 8, wherein the molten salt is a ternary nitrate system.

13. The system of claim 12, wherein the ternary nitrate system comprises between 5% and 10 wt. % of $NaNO_2$, between 30% and 70 wt. % of $NaNO_3$ and between 20% and 65 wt. % of $KNO_3$.

* * * * *